(12) United States Patent
Sandstad

(10) Patent No.: US 7,594,980 B2
(45) Date of Patent: Sep. 29, 2009

(54) DEVICE AND METHOD FOR DISTILLATION

(75) Inventor: Olav E. Sandstad, Trondheim (NO)

(73) Assignee: GND Water AS, Trondheim (NO)

( * ) Notice: Subject to any disclaimer, the term of this patent is extended or adjusted under 35 U.S.C. 154(b) by 582 days.

(21) Appl. No.: 10/498,119

(22) PCT Filed: Nov. 29, 2002

(86) PCT No.: PCT/NO02/00455

§ 371 (c)(1),
(2), (4) Date: Nov. 2, 2004

(87) PCT Pub. No.: WO03/057630

PCT Pub. Date: Jul. 17, 2003

(65) Prior Publication Data

US 2005/0061653 A1 Mar. 24, 2005

(30) Foreign Application Priority Data

Dec. 20, 2001 (NO) .................................. 20016256

(51) Int. Cl.
  *B01D 1/22* (2006.01)
  *B01D 1/28* (2006.01)
  *B01D 3/04* (2006.01)
  *B01D 3/28* (2006.01)
  *C02F 1/08* (2006.01)
  *C02F 1/16* (2006.01)

(52) U.S. Cl. .............................. 203/10; 203/24; 203/87; 203/89; 203/100; 203/DIG. 8; 202/176; 202/182; 202/186; 202/187; 202/237; 159/14; 159/13.2; 159/24.1; 159/27.3; 159/49

(58) Field of Classification Search ............... 159/13.2, 159/14, 24.1, 27.3, 49; 202/176, 182, 186, 202/187, 237; 203/10, 24, 27, 87, 89, 100, 203/DIG. 8
See application file for complete search history.

(56) References Cited

U.S. PATENT DOCUMENTS 3,004,590 A * 10/1961 Rosenblad .................. 159/13.3

(Continued)

FOREIGN PATENT DOCUMENTS

CA    2 360349    7/2000

(Continued)

*Primary Examiner*—Virginia Manoharan
(74) *Attorney, Agent, or Firm*—Dennison, Schultz & Macdonald

(57) ABSTRACT

Device for distillation, for example extraction of fresh water from sea water, including a number of chambers (3) at least in one row, an inlet (10) for distillation fluid, an outlet (11) for the distillation residue, an outlet (5) for the distillate, and a gas compressor (13). Further, the device includes two pipe systems (1,2), where the first pipe system (1) has an inlet (10) for the distillation fluid and an outlet (11) for the distillation residue, together with an outlet (12) for damp. The second pipe system (2) has a number of chambers (3) in a row, each row (3) having an upper inlet (4) for damp and a lower outlet (5) for distillate. The inlets (4) are connected in parallel, and the outlets (5) are connected in parallel. The damp outlet (12) of the first pipe system (1) is connected to the outlet (4) of the second pipe system (2) via the compressor (13), and the first pipe system (1) encloses the second pipe system (2) between the inlet (10) for distillation fluid, the outlet (11) for the distillation residue and the damp outlet (12). The invention also provides a method for distillation by use of such a device.

5 Claims, 3 Drawing Sheets

U.S. PATENT DOCUMENTS

Figure 1:
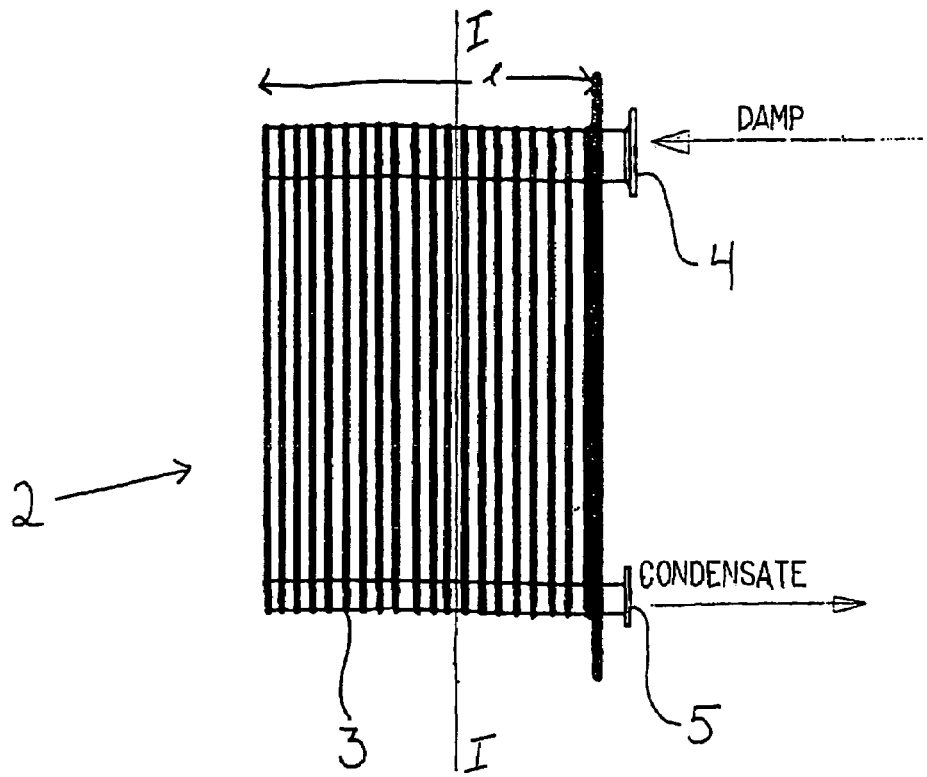

| | | | |
|---|---|---|---|
| 3,021,265 A * | 2/1962 | Sadtler et al. | 202/174 |
| 3,099,607 A * | 7/1963 | Lustenader et al. | 203/10 |
| 3,440,146 A * | 4/1969 | Louw | 203/11 |
| 4,282,058 A * | 8/1981 | Gruter et al. | 159/13.1 |
| 4,302,297 A | 11/1981 | Humiston | |
| 5,232,557 A * | 8/1993 | Kontu et al. | 202/182 |
| 5,266,170 A * | 11/1993 | Weber et al. | 202/185.3 |
| 5,783,047 A * | 7/1998 | Aso et al. | |
| 5,964,986 A * | 10/1999 | Meili | 202/155 |
| 6,555,680 B1 * | 4/2003 | Deshpande et al. | 540/227 |
| 7,422,663 B2 * | 9/2008 | Costa | 202/174 |

FOREIGN PATENT DOCUMENTS

| | | |
|---|---|---|
| DE | 19 915818 | 10/2000 |
| WO | 83 02445 | 7/1983 |

\* cited by examiner

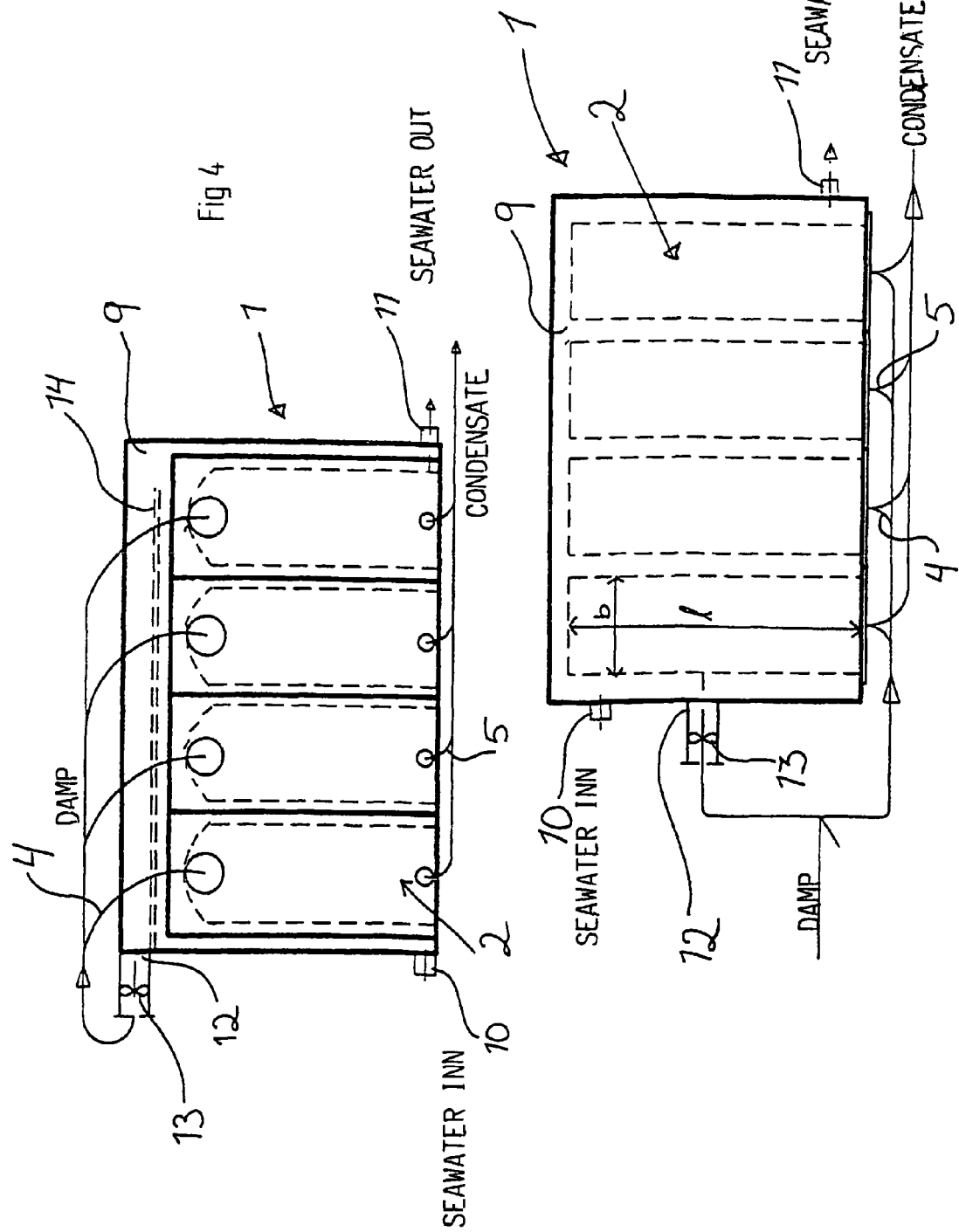

DEVICE AND METHOD FOR DISTILLATION

This application is a filing under 35 U.S.C. 371 of PCT/NO2002/000455 filed Nov. 29, 2002.

The present invention relates to a device for destillation, for example extraction of freshwater from sea water, and a method for the same,

BACKGROUND OF THE INVENTION

In many situations one can have little access to fresh water, but large access to sea water. Examples of this can be small island communities, ships travelling long distances without land contact and platforms or similar installations at sea.

Today, there are several types of desalination installations to provide freshwater from sea water, as for example described in U.S. Pat. No. 4,391,676 and WO 93/10048. Both these installations utilize a system similar to common heat exchangers as the sea water is evaporated and the damp is compressed and condensed.

Most known desalination installations have a relatively complex structure, therefore they are expensive to make and to operate. Parts of the installations also require frequent shutdowns and maintenance, which further contributes to costs. Most often, the sea water corrodes different parts of the installation, and thus at intervals some parts must be replaced.

OBJECT OF THE INVENTION

The object of the present invention is to provide a destination device and method which has a stable operation, require little maintenance and is inexpensive and energy saving.

THE INVENTION

The present invention is based on the old principle of boiling sea water, and condensation of the damp to produce freshwater. According to the present invention a new device and a new method is used to provide this. The device and the method can also be used for other destination purposes, but this patent publication will only describe the destination of sea water.

The device according to the present invention substantially comprises two pipe systems, where the first pipe system comprises an entry and a lower and an upper exit, and the second system is comprises an entry and an exit, as the upper exit of the first system is connected to the entry of the second system via a compressor. In the first pipe system parts of the destination fluid is evaporated, and in the second pipe system the damp is condensed to destillate, as the fluids in the pipe systems are heat exchanged with each other.

The second pipe system, as the damp is condensed to destillate, is shaped as a row of vertical chambers. The inlets of the chambers are connected in parallel, such that the damp only passes through one chamber.

By the expression connected in parallel, it is in this context meant that objects connected in parallel are connected such that the probability for the fluid to flow in each of the objects are equal. Fluid flowing into one object is not allowed to get into the other parallel connected objects.

The first pipe system mainly comprises an entry for destination fluid, an upper exit for damp, as the exit is connected to the entry of the second pipe system, together with a second exit for the destination residue, since only some of the destination fluid will evaporate. The first pipe system encloses the second pipe system between the entry and the exits. In the simplest embodiment the first pipe system is a space with an entry and a lower and an upper exit, where the second pipe system is placed in the space. Obviously, the space must be shaped such that the damp exit from the room is connected to the entry of the second pipe system placed inside the space, for example by a pipe extending through the wall in the space and to the entry of the second pipe system, and accordingly for the exit from the second pipe system. In a preferred embodiment of the present invention, a first pipe system can enclose a number of second pipe systems, where the inlets to the second pipe systems are connected in parallel.

The temperature of the incoming destination fluid and the outgoing destillate should be near the boiling point, such that the heat exchange between the pipe systems essentially result in evaporation and condensation.

EXAMPLE

Figure 2:
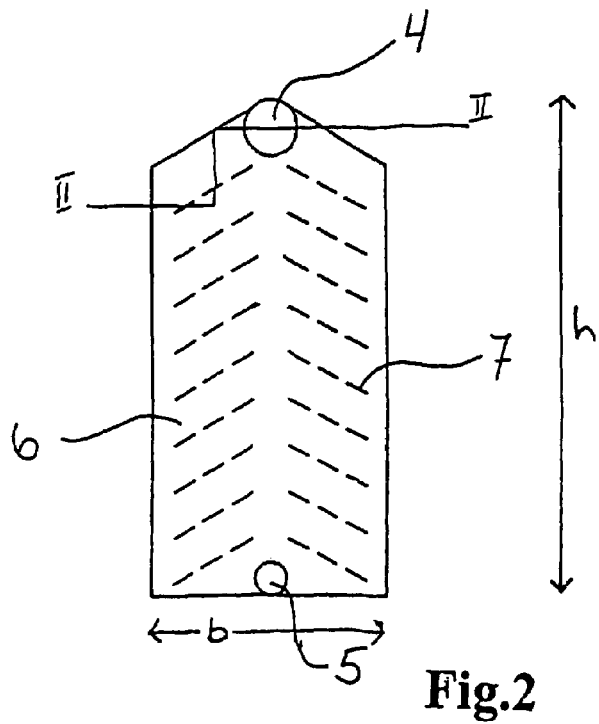
Figure 3:
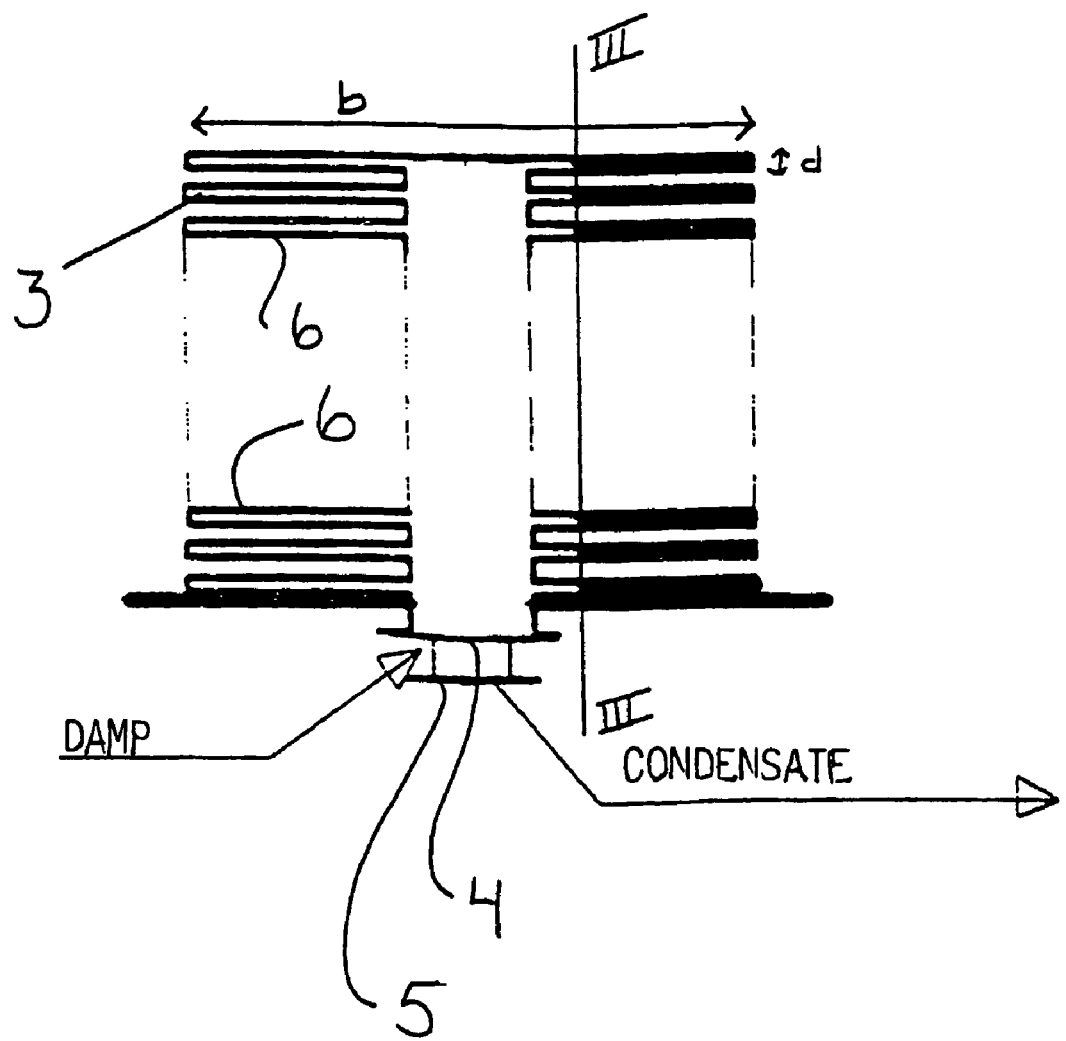

The invention will in the following be described as a process to produce freshwater from sea water, with reference to the enclosed drawings, where:

FIG. 1 shows a vertical longitudinal cross sectional view of a second pipe system of the device according to the present invention, FIG. 2 shows a vertical transverse cross sectional view of a second pipe system along the line I-I in FIG. 1, FIG. 3 shows a horizontal cross sectional view of the second pipe system according to FIGS. 1 and 2, taken along the II-II in FIG. 2, FIG. 4 shows a preferred embodiment of the device according to the invention, seen from the side, and FIG. 5 shows the device according to FIG. 4 from above.

FIG. 1 shows a vertical longitudinal cross sectional view of a second pipe system 2 of the device according to the invention, as damp is condensed to fresh water. The second pipe system 2 comprise a number of chambers 3 in a row, the number of which should be optimized according to the process being run, the total design of the installation and the amount to be destilled. Due to drawing limitations, FIG. 1 shows a random number. Each chamber 3 of the row is formed with an inlet 4 for damp in the upper end and an outlet 5 for condensate/freshwater in the lower end. The inlets are connected in parallel such that damp enter each chamber 3 in parallel. The outlets are connected such that the fresh water leaves each chamber in parallel. The chambers 3 are mounted at a distance in a row, as the depth d of each chamber, and the distance between the chambers make up the length l of the second pipe system.

In FIG. 2 a cross sectional view along the line I-I in FIG. 1 is shown, and the cross sectional view shows a vertical wall 6 in one of the chambers. Each chamber 3 preferably comprises two identical, vertical walls 6 of heat-conducting material, as the walls 6 make up height h and width b in the chamber 3. Each chamber 3 preferably has a vertical extension, as height h is larger than width b and both are substantially larger than depth d. The vertical wall 6 is formed with an upper inlet 4 for damp and a lower outlet 5 for condensate. In the embodiment illustrated the wall 6 is provided with corrugations 7. This is not necessary to make the device operate, but provides a preferable embodiment. By having these corrugations 7, the seawater between the chambers 3, on the outside of the second pipe system 2, can move between the chambers 3, such that the heat exchange transverse to the walls 6 is optimal and the water evaporates faster. In the embodiment illustrated, the upper part of the wall 6 is formed as a rounded tip, as the inlet 4 for damp is placed at the tip. This is not a requirement for the device to operate properly, but will cause better separation of the damp and at the same time transported water will deflect and fall back to the surface of the seawater in the first pipe system 1.

The vertical walls 6, constituting height h and width b in a chamber, are preferably fastened to each other with two vertical interior walls 8 along the vertical side edges, and a horizontal interior wall along the lower edge, forming the bottom of the chamber. Also in the upper end the walls 6 will be fastened to each other with interior walls. Whether the last mentioned interior wall will be horizontal or sloping, will be decided by the shape of the upper edge of the interior walls 6, as the interior wall preferably follow this. The width of the interior walls 8 dividing the walls 6 should/must of course be equal, such that a chamber 3 gets the same depth extension d in the whole chamber 3, both horizontally and vertically. The interior walls 8 can preferably also be of a heat-conducting material.

A vertical wall 6 can preferably be punched out with at least an interior wall 8 and are bent to fit. In this way a smaller number of parts and joints are required for each chamber. The different parts are preferably fastened permanently, such as by means of welding.

The different chambers 3 are, as mentioned, arranged in row, and both the inlets 3 and the outlets 5 are connected in parallel. The chambers 3 are in the embodiment of FIG. 1 fastened to each other such that the damp inlet 4 and the condensate outlet 5 each is one pipe running through all the chambers 3, from the first to the last, as the pipes are open through each chamber. Obviously, this can be done in many other ways.

FIG. 3 shows the second pipe system seen from above, partly in horizontal cross section. On the left side of line III-III in the drawing, the pipe system is cut through, and on the right side of the line the pipe system is seen from above. Due to drawing limitations, only the first and last chambers 3 with regard to the damp inlet 4 are drawn. From the drawing, it results that the inlet 4 is in open connection with all other chambers 3 and that the chambers 3 are closed at the upper end. Correspondingly, they are, of course, also closed at their lower end, except from the outlet for condensate 5, as described above.

As shown in the drawings, the inlet 4 for damp and the outlet 5 for condensate are placed directly opposed to each other, centred in the width-direction of the chambers 3. This is not necessary, but in this way the best distribution of damp in the chamber 3, together with best collection of condensate, is achieved.

The second pipe system 2, described above, is placed inside the first pipe system 1, and the fluids in the pipe systems 1, 2 are heat-exchanged with each other because the damp in the chambers 3 in the second pipe system 2 will heat the sea water in the first system 1, until boiling. In the simplest embodiment, the first pipe system 1 comprises a large space 9, with inlets 10 and outlets 11, 12. Sea water is guided in via the inlet 10, and out via a lower outlet 11. In space 9 the sea water will be heat exchanged with the damp in the chambers 3 of the second pipe system 2, through the walls 6, as the sea water will flow in between the chambers 3, and a part of the seawater will evaporate. Consequently, the second pipe system 2 will be located in sea water, as the inlet 4 for damp will be over the water surface, while the outlet 5 for condensate will be below the water surface.

Between the upper exit 12 of the first pipe system 1 and the entry 4 of the second pipe system there is placed a compressor 13 which compresses the damp such that the temperature is increased and such that the heat exchange will work properly. It will also increase the pressure, such that the pressure of the second pipe system 2 is greater than the pressure of the first pipe system 1.

Sea water flowing into the entry 10 of the first pipe system comes into contact with the outside of the second pipe system 2. The sea water will be heated by the damp of the chambers 3 of the second pipe system 2, and a part of the water in the seawater will evaporate and ascend upwardly. Frequently, the damp will carry drops of sea water. In the first end of the first pipe system 1 there is a damp exit 12 through which the damp can flow out of the first pipe system 1. The sea water drops carried by the damp will fall down to the sea water surface. The damp flowing out through the upper exit 12 of the first pipe system is guided into the compressor 13 where pressure and temperature are increased. The compressed damp is then guided into the entry 4 of the second pipe system 2, and will be cooled by the seawater located on the outside of the second pipe system 2. The damp is condensed and can be removed as freshwater. The first pipe system 1 also has an exit for sea water 11, and the part of the sea water which does not evaporate will be guided out through this. This sea water will have a higher salt concentration than incoming sea water, because of the evaporation. This difference should be kept low, because an increase of the salt concentration will increase the boiling point of the water and the corrosion of the pipe systems.

In FIGS. 4 and 5 there is shown side elevation and top plan views of a preferable embodiment of the present invention. The first pipe system 1 comprises four second pipe systems 2, shown with broken lines, as the inlets 4 to the four second pipe systems 2 are connected in parallel.

The first pipe system 1 still has one entry 10 and one exit 11 for sea water, and an upper exit 12 for damp. As shown in FIG. 4, a drop collector 14 is provided in the upper end of the first pipe system 1, prior to the exit 12 for damp. The drop collector 14 results in the sea water drops in the damp will be separating from the damp, consequently the destination will be improved. The damp is collected and guided to a compressor 13, before it is distributed to the four second pipe systems 2, shown in FIGS. 4 and 5 as broken line boxes. The four second pipe systems 2 each have one entry 4 for damp, and one exit 5 for condensate. The entries and the exits are connected in parallel, and the exits are gathered together such that the installation has only one exit.

In the illustrated embodiments inlets 4 for damp and outlets 5 for condensate are shown on the same longitudinal end of the second pipe system, in the upper and lower ends respectively. The pipe system can of course also be arranged such that inlets 4 and outlets 5 are placed at opposite longitudinal ends.

The first and the second pipe system should preferably be made from a material resistant to sea water, for example titanium. If the device is used for other destination purposes, the pipe systems should be made from a material resistant to the fluids being destillated. Further, the second pipe system preferably should be made of a heat-conducting material, such that the heat exchange between the first and the second pipe systems is optimized. The first pipe system can preferably be made from a less heat-conductive material, for example composite materials, such that the heat loss to the surroundings is minimal.

The device and the method can of course also be used for other destination purposes, such as destination of alcohol from a mixture of alcohol and water, which will be obvious for a person skilled in the art. The present invention will not be limited to the embodiments of the invention illustrated and described above, as will be understood by a person skilled in the art. The invention also defines combinations and subcombinations of the described features, together with modifications and variations of these, being obvious for a person skilled in the art, within the scope of the following claims.

The invention claimed is:

1. Device for distillation of a liquid containing dissolved solids, comprising:
   a first pipe system comprising a lower inlet for liquid to be distilled, an outlet for distillation residue, and an upper outlet for damp,
   a second pipe system comprising a plurality of chambers in a row, each said chamber having an upper inlet for damp and a lower outlet for distillate, with the inlets connected in parallel and connected to a second pipe system inlet, and the outlets connected in parallel and connected to a second pipe system outlet,
   the first pipe system enclosing the second pipe system between the inlet for distillation liquid, the outlet for distillation residue and the outlet for damp,
   a gas compressor means connected between the first pipe system outlet for damp, and the second pipe system inlet, constructed and arranged for heating and compressing damp supplied from the first pipe system outlet for damp to the second pipe system inlet,
   means for using heat exchange to cause the heated and compressed damp in the chambers to heat the liquid to be distilled in the first pipe system, a portion of the liquid to be distilled being thereby evaporated and a portion of the damp in the chambers being thereby condensed, and
   means for removing the condensed damp through the outlet for distillate of the second pipe system, and removing the distillate from the device.

2. Device according to claim 1, wherein the first pipe system encloses at least two said second pipe systems, the inlets of the second pipe systems being connected in parallel.

3. Device according to claim 1, wherein each of the chambers of the second pipe systems has two vertical walls, defining a height h and a width b for the chambers, the walls comprising a heat-conducting material.

4. Device according to claim 1, wherein the damp inlets and the distillate outlets of the second pipe system are centered in a width dimension for each of said chambers.

5. Method for distillation, of a liquid containing dissolved solids, comprising the steps of:
   providing a device comprising:
   a first pipe system comprising a lower inlet for liquid to be distilled, an outlet for distillation residue, and an upper outlet for damp,
   a second pipe system comprising a plurality of chambers in a row, each said chamber having an upper inlet for damp and a lower outlet for distillate, with the inlets connected in parallel and connected to a second pipe system inlet, and the outlets connected in parallel and connected to a second system outlet, and
   a gas compressor means connected between the first pipe system outlet for damp, and the second pipe system inlet, constructed and rearranged for heating and compressing damp supplied from the first pipe system outlet for damp to the second pipe system inlet,
   wherein the first pipe system encloses the second pipe system between the inlet for distillation liquid, the outlet for distillation residue and the outlet for damp;
   guiding the liquid to be distilled into the inlet of the first pipe system;
   removing damp from an upper damp outlet of the first pipe system and passing the damp through the compressor to the inlet of the second pipe system, the damp being heated and compressed in the compressor;
   passing the heated and compressed damp through the chambers of the second pipe system;
   using heat exchange to cause the heated and compressed damp in the chambers to heat the liquid to be distilled in the first pipe system, a portion of the liquid to be distilled being thereby evaporated and a portion of the damp in the chambers being thereby condensed, and
   removing the condensed damp through the outlet for distillate of the second pipe system, and removing the distillate from the device.

\* \* \* \* \*